UNITED STATES PATENT OFFICE.

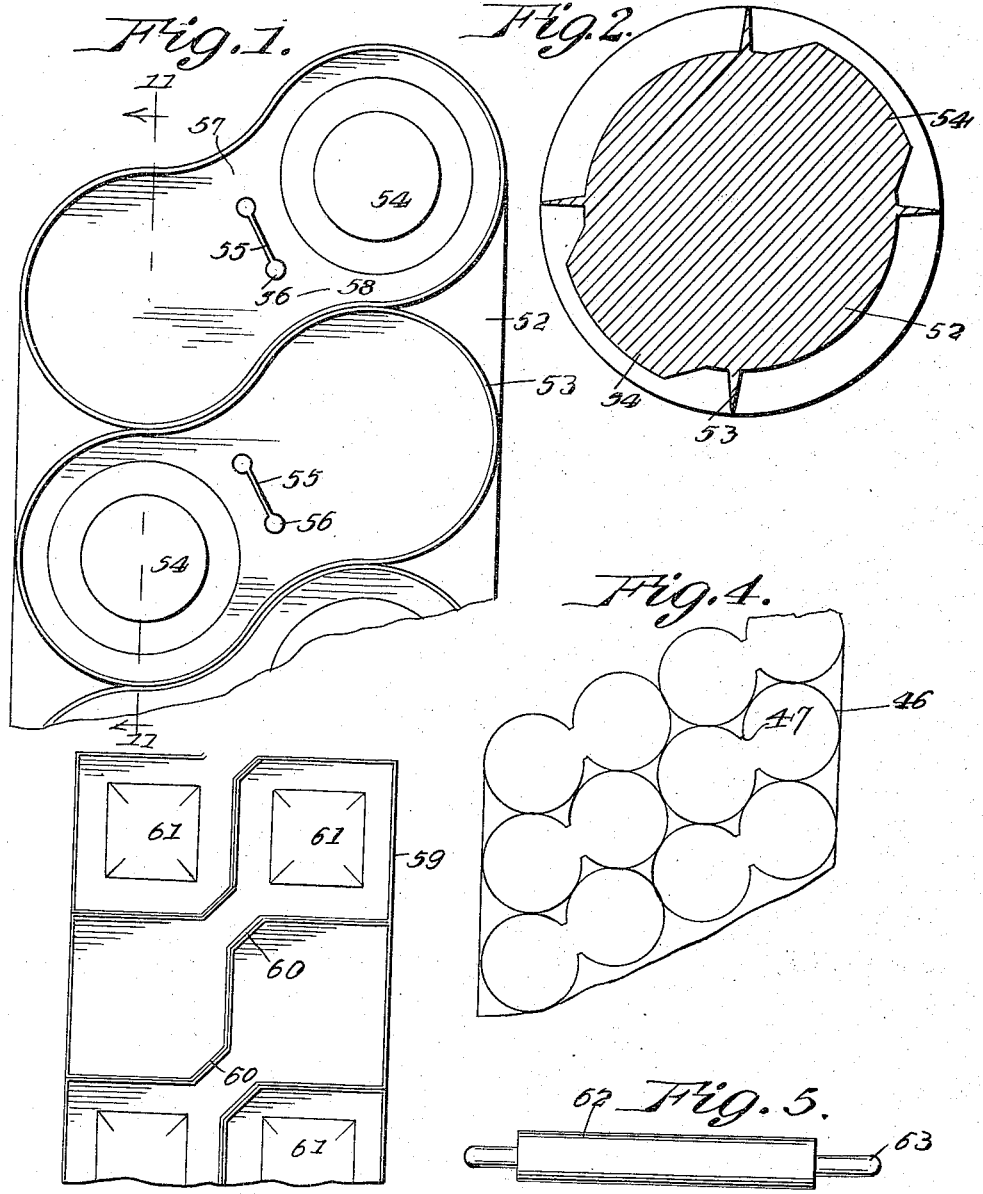

MANASSES DEVINE, OF JACKSON, CALIFORNIA.

DOUGH-CUTTER.

1,147,380.

Specification of Letters Patent. Patented July 20, 1915.

Application filed September 10, 1913. Serial No. 789,095.

*To all whom it may concern:*

Be it known that I, MANASSES DEVINE, a citizen of the United States of America, and resident of Jackson, in the county of Amador and State of California, have invented certain new and useful Improvements in Dough-Cuttters, of which the following is a specification.

This invention relates to dough cutters and particularly to means for shaping dough by a cutting process in order that one portion or section of the dough may be conveniently folded over the other portion or section thereof for producing what the inventor terms "nugget folds".

An object of this invention is to produce a combined cutter and pressing device for forming the external configuration of the dough and for shaping the surfaces thereof in order that when one section is folded on the other, a symmetrical and properly proportioned loaf or bun results, means being furthermore provided for creasing or producing impressions for receiving butter or a substitute therefor, which may be interposed between the folds of the dough, which butter or substitute is regarded as a desirable addition to the composition of which the edible is formed.

A still further object of this invention is to produce a cutter and forming device of the character indicated having means for cutting the dough to produce the external configuration of the product, the said device being also provided with a cutter intermediate the length of the one forming the external configuration, whereby lateral incisions at right angles to incisions at right angles to the lateral incisions are formed simultaneously with the formation of the blank or block of dough from which the article is to be formed, it being the purpose of the inventor to produce by the use of the intermediate cutters, hinged joints between the sections of the dough for the purpose of facilitating the folding of one portion or section of the dough on the other.

It is furthermore, an object of the invention to provide means for exerting pressure on the surface of the dough for dislodging portions of it and preferably for pressing the same toward the marginal blade and in the provision of novel means for pressing the dough from portions of the intermediate cutters which are utilized for producing the incisions heretofore mentioned.

It is furthermore an object of this invention to provide a cutter having novel means for producing gutters or creases in the dough for receiving butter or the like and to provide the same with indicia so that the identity of the product may be determined, or for other purposes.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a plan view of nested cutters adapted to be applied to a roller; Fig. 2 illustrates a sectional view on the line corresponding with the line 11—11 of Fig. 1, showing the roller in section; Fig. 3 illustrates a plan view of cutters similar to those shown in Fig. 1 with the exception that the configuration is slightly modified; Fig. 4 illustrates a diagrammatic view showing cutters of slightly modified configuration; Fig. 5 illustrates a view in elevation of a roller to which the cutter plates are applicable; Fig. 6 illustrates a slightly modified construction of the roller such as is shown in Fig. 5.

In Figs. 1 and 2, I illustrate cutter bodies 52 having blades 53 thereon, one of which is nested with relation to the other to produce the greatest number of blanks from a certain area and this is due, as stated, to the manner of nesting the blades. In this embodiment of the invention, the body has projecting portions 54 which compress dough to which the cutters are applied and intermediate the length of each blade, there is a transversely disposed blade 55 terminating in enlargements 56 at each end, which serve to prevent cohesion of the dough as in the forms heretofore described. It is apparent that the blade 55 will produce an initial in the dough and that it will extend transversely of the blank and terminate short of the edges thereof, thus producing what may be termed side hinges at the points 57 and 58 at which points one portion of the dough may be folded on the other.

In Fig. 3, I show a modified configuration of the blades 59 which are approximately square at each end and have what may be regarded as neck portions 60 connected to the square portions at the corners thereof and one square portion of each cutter has its body produced with a projecting surface 61 for pressing the dough cut thereby, as heretofore described.

Fig. 4 illustrates diagrammatically the nesting of cutters to produce a large number of blanks from a mass of dough, an economical arrangement which will result in little waste or scraps. The roller 62 may be employed for carrying cutters, which roller may be caused to travel over the rolled dough and it is provided with hand grasps 63 to facilitate its manipulation.

Fig. 6 illustrates a roller 64 substantially the same as that shown in Fig. 5, except that it is larger in diameter but shorter.

I claim—

1. In a dough cutter, a body having nested cutting devices, each comprising relatively large end portions and a restricted connecting portion or neck, the neck portion of one cutter being nested with relation to the enlarged portions of the contiguous cutters, and a projecting face within the area of one of the comparatively large portions of each cutter for pressing dough toward the said cutter.

2. In a dough cutter, a body having nested cutting devices, each comprising relatively large end portions and a restricted connecting portion or neck, the neck portion of one cutter being nested with relation to the enlarged portions of the contiguous cutters.

In testimony whereof, I affix my signature in the presence of two witnesses.

MANASSES DEVINE

Witnesses:
F. W. RUHSER,
T. M. RYAN.

Copies of this patent may be obtained for five cents each, by addressing the "Commissioner of Patents, Washington, D. C."